US008245514B2

(12) United States Patent
Tu et al.

(10) Patent No.: US 8,245,514 B2
(45) Date of Patent: Aug. 21, 2012

(54) COMBUSTION LINER FOR A GAS TURBINE ENGINE INCLUDING HEAT TRANSFER COLUMNS TO INCREASE COOLING OF A HULA SEAL AT THE TRANSITION DUCT REGION

(75) Inventors: John S. Tu, West Hartford, CT (US); Craig F. Smith, Ashford, CT (US); Jaisukhlal V. Chokshi, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 949 days.

(21) Appl. No.: 12/170,602

(22) Filed: Jul. 10, 2008

(65) Prior Publication Data

US 2010/0005803 A1 Jan. 14, 2010

(51) Int. Cl.
*F02C 1/00* (2006.01)
*F02G 3/00* (2006.01)

(52) U.S. Cl. .............................. 60/752; 60/755; 60/39.37

(58) Field of Classification Search ............ 60/752–760, 60/804, 805, 796, 800, 39.37
See application file for complete search history.

(56) References Cited

U.S. PATENT DOCUMENTS 4,016,718 A 4/1977 Lauck
4,232,527 A 11/1980 Reider
4,236,378 A 12/1980 Vogt
4,292,810 A * 10/1981 Glenn .............................. 60/757
4,380,906 A 4/1983 Dierberger
4,653,279 A 3/1987 Reynolds
4,695,247 A * 9/1987 Enzaki et al. ................. 431/352
4,864,827 A 9/1989 Richardson
4,916,905 A 4/1990 Havercroft
5,353,865 A * 10/1994 Adiutori et al. ............... 165/133
5,461,866 A 10/1995 Sullivan
5,724,816 A 3/1998 Ritter
6,134,877 A * 10/2000 Alkabie ........................... 60/800
6,546,730 B2 * 4/2003 Johnson et al. ................. 60/752
6,598,781 B2 * 7/2003 Hasz et al. ..................... 228/245
6,842,980 B2 * 1/2005 Young et al. ................. 29/889.2
6,901,758 B2 * 6/2005 Grady et al. ..................... 60/752
7,007,482 B2 * 3/2006 Green et al. ..................... 60/752
7,010,921 B2 3/2006 Intile
7,093,439 B2 * 8/2006 Pacheco-Tougas et al. ..... 60/752
7,104,067 B2 * 9/2006 Bunker ........................... 60/752
7,373,778 B2 * 5/2008 Bunker et al. .................. 60/752
7,748,221 B2 * 7/2010 Patel et al. ....................... 60/752
2002/0066273 A1 * 6/2002 Kitamura et al. ............... 60/737
2002/0148228 A1 * 10/2002 Kraft et al. ....................... 60/772
2003/0056516 A1 * 3/2003 Hadder ........................... 60/772
2005/0262844 A1 12/2005 Green
2009/0120093 A1 * 5/2009 Johnson et al. ................. 60/752
2010/0186415 A1 * 7/2010 Brown et al. .................. 60/755
2010/0223931 A1 * 9/2010 Chila et al. ....................... 60/760
2010/0242487 A1 * 9/2010 Davis et al. ..................... 60/772
2011/0016869 A1 * 1/2011 Iwasaki ........................... 60/752
2011/0120135 A1 * 5/2011 Johnson et al. ................. 60/772
* cited by examiner

*Primary Examiner* — William H Rodriguez
(74) *Attorney, Agent, or Firm* — Carlson, Gaskey & Olds, PC

(57) ABSTRACT

A combustion duct assembly has a transition duct and a combustion liner having a hula seal at a downstream end that is forced within an inner wall of the transition duct. The combustion liner is held within the transition duct by the hula seal, but allowed to move relative to the transition duct. The combustion liner is formed with heat transfer columns adjacent the downstream end, and radially inwardly of the hula seal.

15 Claims, 2 Drawing Sheets

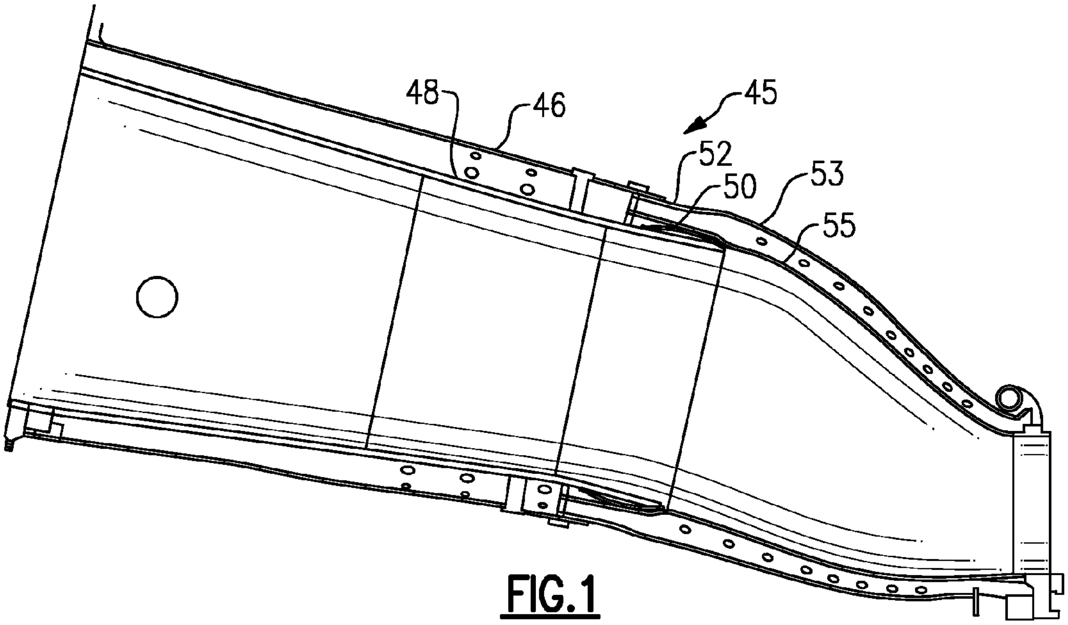
FIG.1
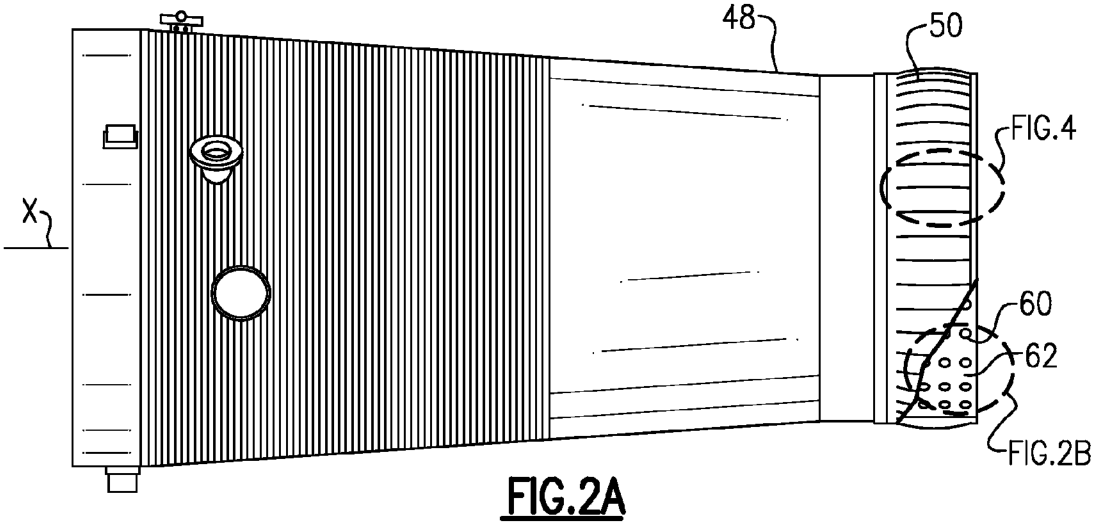
FIG.2A
FIG.2B
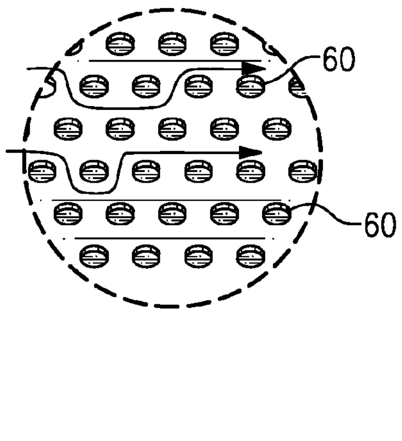

COMBUSTION LINER FOR A GAS TURBINE ENGINE INCLUDING HEAT TRANSFER COLUMNS TO INCREASE COOLING OF A HULA SEAL AT THE TRANSITION DUCT REGION

BACKGROUND OF THE INVENTION

This application relates to a combustion liner with cooling structure for a hula seal.

Gas turbine engines are known, and include a compressor section compressing air and delivering it downstream to a combustion section. The compressed air is mixed with fuel in the combustion section and burned. Products of the combustion pass downstream to a turbine section.

A combustion liner directs the products of combustion from the combustion section downstream to the turbine section. The combustion liner becomes quite hot during operation. As such, it is known to provide cooling air to cool the combustion liner.

A downstream end of the combustion liner typically fits into a transition duct which is connected to the turbine section. A hula seal attached to the combustion liner provides a slidable connection to the transition duct. Since there can be a good deal of relative expansion between the transition duct and the combustion liner, the two components are allowed to slide relative to each other. The hula seal provides a spring bias to hold the combustion liner in the transition duct, but still allow the sliding movement.

In the past, it is known to provide cooling air to a location between the hula seal and the combustion liner. A plurality of ridges are formed in an outer periphery of the combustion liner to provide cooling air paths. This design does not provide as efficient heat transfer as is desired.

SUMMARY OF THE INVENTION

A combustion duct assembly has a transition duct and a combustion liner. The combustion liner has a hula seal at a downstream end that is forced within an inner wall of the transition duct. The combustion liner is held within the transition duct by the hula seal, but allowed to move relative to the transition duct. The combustion liner is formed with heat transfer columns adjacent the downstream end, and radially inwardly of the hula seal. The combustion liner itself is also claimed.

The use of columns increases the heat transfer coefficient while providing a robust design that is relatively inexpensive to manufacture.

These and other features of the present invention can be best understood from the following specification and drawings, the following of which is a brief description.

BRIEF DESCRIPTION OF THE DRAWINGS

FIG. 1 is a cross-sectional view of a combustion duct assembly.

FIG. 2A is a perspective side view of a combustion liner with a cut-away outer portion showing an inner detail.

FIG. 2B is an enlarged portion of FIG. 2A, at the circle labeled 2B in FIG. 2A.

DETAILED DESCRIPTION OF THE PREFERRED EMBODIMENT

Figure 3:
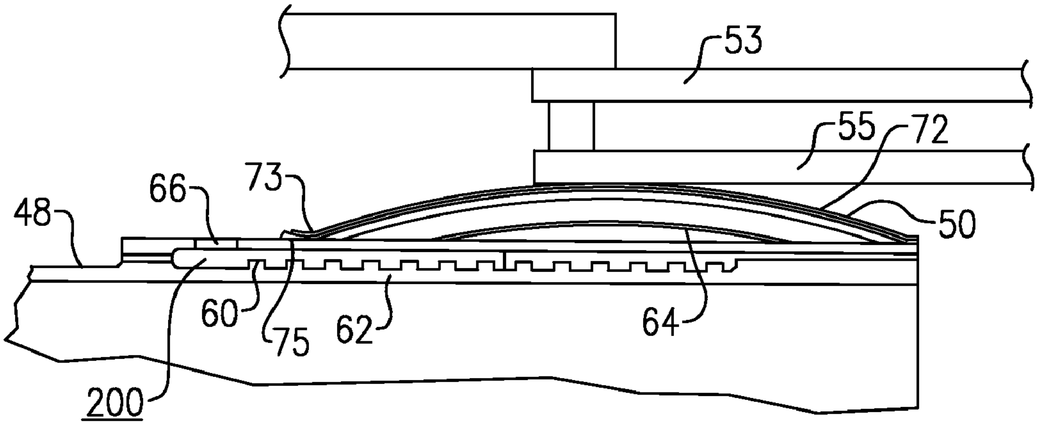
FIG. 3 is a cross-sectional view showing more detail of the combustion liner than the cross-section of FIG. 1.

FIG. 1 shows a combustion duct assembly 45 for communicating an upstream combustion section to a downstream turbine section. An outer housing 46 sits outwardly of a transition duct 52. A combustion liner 48, which includes a component known as a flow sleeve, and which is shown somewhat schematically in this view, also includes a hula seal 50 attached to a liner body. The hula seal 50 is forced into an inner wall 55 of the transition duct 52, which is spaced from an outer wall 53. The outer housing 46 is sealed on the outer wall 53.

The hula seal 50 is biased against the inner wall 55, and thus serves to hold the combustion liner 48 to the transition duct 52. However, the two can slide relative to each other when there is relative expansion due to the hot gasses that will flow within the combustion liner 48.

FIG. 2A shows the combustion liner 48, and its attached hula seal 50. An axis X extends axially from an upstream end (to the left of FIG. 2A) toward a downstream end (to the right of FIG. 2A). At the bottom, in cut-away, one can see columns 60 that are formed on an inner wall 62 of the combustion liner at an aft or downstream end. As can be appreciated from the expanded view of FIG. 2B, the columns 60 are arranged in an array, such that there are rows extending both axially and circumferentially about axis X. This causes the cooling air to flow in a torturous path around the columns 60.

As shown in FIG. 3, the hula seal 50 has inner seal portions 64 and outer spring fingers 72 which are forced within the inner wall 55. Cooling air holes 66 provide air into a chamber 200 between an inner wall 62 and a spaced outer wall 75 of the combustion liner 48. This air flows over the columns 60 and between the inner wall 62 and the outer wall 75 of the combustion liner 48.

Figure 4:
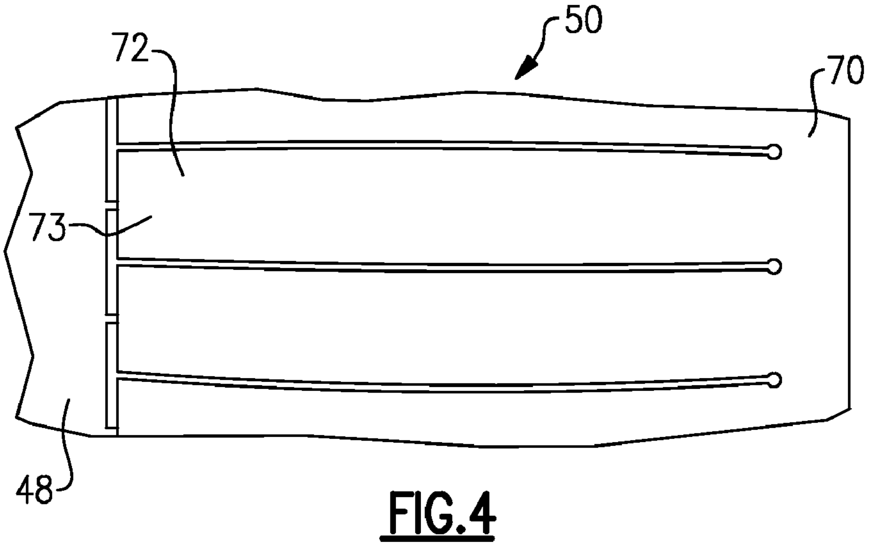
FIG. 4 is a partial view of FIG. 2A at the circle 4 as shown in FIG. 2A.

As shown in FIG. 4, the hula seal 50 has an end 70 that is fixed to the combustion liner 48. An opposed end 73 of fingers 72 is biased resiliently against the combustion liner 48 to provide the bias force to hold the combustion liner 48 within the transition duct 52. The bias force includes a bias force radially inwardly along an axially intermediate portion of the fingers 72 from the inner periphery of the inner wall 55, and a bias force against the opposed end 73 of the fingers, and against the outer wall 75 of the combustion liner 48.

The columns 60 allow air to flow between the hula seal 50 and the combustion liner 48. Use of the columns 60 increases the flow cross-sectional area of the heat transfer surfaces, and further facilitates torturous air flow over a greater portion of the outer periphery of the combustion liner than if the simple ridges were utilized. The torturous flow path increases the heat transfer efficiency.

While the columns 60 are illustrated in one array in FIGS. 2A and 2B, they may be in any other orientation, including staggered rows. Moreover, the exact size and shape of the columns may be selected to achieve desired heat transfer results.

Also, while the invention is illustrated as the complete duct assembly, the combustion liner 48 can also be retrofitted into existing duct assemblies 45.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A combustion duct assembly comprising:

a transition duct having an inner wall;

a combustion liner centered on an axis, with the axis defining an upstream end and a downstream end, and the combustion liner having a hula seal at the downstream end that is forced within the inner wall of said transition duct, said combustion liner being held within said transition duct by said hula seal, but allowed to move relative to said transition duct; and said combustion liner being formed with heat transfer columns adjacent said downstream end of the combustion liner, and radially inwardly of said hula seal, with said heat transfer columns creating a tortuous path for cooling airflow.

2. The assembly as set forth in claim 1, wherein said hula seal is fixed to said combustion liner at said downstream end, and has spring fingers extending towards said upstream end, with said spring fingers biased against said combustion liner.

3. The assembly as set forth in claim 1, wherein an outer housing is secured radially outwardly of said combustion liner and to an outer surface of said transition duct.

4. The assembly as set forth in claim 1, wherein said columns are cylindrical.

5. The assembly as set forth in claim 1, wherein said columns are arranged in an array, with rows of said columns extending both along an axial dimension of said combustion liner, and along a circumferential dimension.

6. The assembly as set forth in claim 1, wherein a chamber is formed in said combustion liner at said downstream end, and between radially inner and outer walls, with said columns formed on said inner wall of said combustion liner.

7. The assembly as set forth in claim 6, wherein said hula seal is secured to said outer wall of said combustion liner.

8. A combustion liner comprising:

a liner body extending along an axis between an upstream end and a downstream end, and having a hula seal at the downstream aft end;

said liner body being formed with heat transfer columns adjacent said downstream end, and radially inwardly of said hula seal; and with said heat transfer columns creating a tortuous airflow path for cooling the air.

9. The combustion liner as set forth in claim 8, wherein said hula seal is fixed to said liner body at said downstream end, and has spring fingers extending towards said upstream end, with said spring fingers biased against an outer periphery of said liner body.

10. The combustion liner as set forth in claim 8, wherein said columns are cylindrical.

11. The combustion liner as set forth in claim 8, wherein said columns are arranged in an array, with rows of said columns extending both along an axial dimension of said combustion liner, and along a circumferential dimension.

12. The combustion liner as set forth in claim 8, wherein a chamber is formed in said combustion liner at said downstream end, and between radially inner and outer walls, with said columns formed on said inner wall.

13. The combustion liner as set forth in claim 12, wherein said hula seal is secured to said outer wall.

14. A combustion duct assembly comprising:

a transition duct having an inner wall;

a combustion liner centered on an axis, with the axis defining an upstream end and a downstream end, and the combustion liner having a hula seal at the downstream end that is forced within the inner wall of said transition duct, said combustion liner being held within said transition duct by said hula seal, but allowed to move relative to said transition duct;

said combustion liner being formed with heat transfer columns adjacent said downstream end of the combustion liner, and radially inwardly of said hula seal; and said columns are arranged in an array, with rows of said columns extending both along an axial dimension of said combustion liner, and along a circumferential dimension.

15. The assembly as set forth in claim 14, wherein said heat transfer columns create a tortuous airflow path.

* * * * *